(12) United States Patent
Wei et al.

(10) Patent No.: US 10,419,773 B1
(45) Date of Patent: Sep. 17, 2019

(54) HYBRID LEARNING FOR ADAPTIVE VIDEO GROUPING AND COMPRESSION

(71) Applicant: Amazon Technologies, Inc., Seattle, WA (US)

(72) Inventors: Hai Wei, Seattle, WA (US); Yang Yang, Issaquah, WA (US); Lei Li, Kirkland, WA (US); Amarsingh Buckthasingh Winston, Seattle, WA (US); Avisar Ten-Ami, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 9 days.

(21) Appl. No.: 15/933,222

(22) Filed: Mar. 22, 2018

(51) Int. Cl.
| | |
|---|---|
| *H04N 19/46* | (2014.01) |
| *H04N 19/169* | (2014.01) |
| *H04N 19/14* | (2014.01) |
| *H04N 19/132* | (2014.01) |
| *G06N 20/00* | (2019.01) |

(52) U.S. Cl.
CPC ............ *H04N 19/46* (2014.11); *G06N 20/00* (2019.01); *H04N 19/132* (2014.11); *H04N 19/14* (2014.11); *H04N 19/169* (2014.11)

(58) Field of Classification Search
USPC ..................................................... 375/240.02
See application file for complete search history.

(56) References Cited

U.S. PATENT DOCUMENTS

| | | | |
|---|---|---|---|
| 6,574,279 B1* | 6/2003 | Vetro ................ | H04L 29/06027 375/240.08 |
| 9,619,521 B1* | 4/2017 | Sukthankar ............ | G06N 20/00 |
| 9,715,902 B2* | 7/2017 | Coviello ................ | G11B 27/28 |
| 2002/0016961 A1* | 2/2002 | Goode ................... | H04N 7/173 725/9 |
| 2014/0044197 A1* | 2/2014 | Liao ................. | H04N 21/23418 375/240.26 |
| 2017/0177943 A1* | 6/2017 | Mehrseresht ........... | G06T 7/248 |
| 2017/0289624 A1* | 10/2017 | Avila ................. | H04N 21/4542 |
| 2018/0032623 A1* | 2/2018 | Zhang ................. | G06K 9/6218 |

\* cited by examiner

*Primary Examiner* — Behrooz M Senfi
(74) *Attorney, Agent, or Firm* — Weaver Austin Villeneuve & Sampson LLP

(57) ABSTRACT

Methods and apparatus are described in which both supervised and unsupervised machine learning are used to classify video content for compression using encoding profiles that are optimized for each type of video content.

20 Claims, 5 Drawing Sheets

HYBRID LEARNING FOR ADAPTIVE VIDEO GROUPING AND COMPRESSION

BACKGROUND

Online streaming technologies are among the dominant mechanisms by which people consume video content. These technologies rely on video compression techniques to make efficient use of network bandwidth when delivering content streams. Video compression techniques take advantage of temporal and spatial redundancies in video frames to reduce the amount of information transmitted in a video content stream. The operation of an encoder that compresses video is governed by an encoding profile that includes settings that are typically manually selected by an engineer in an effort to strike a balance between video quality and bit rate. The encoding profile that strikes the desired balance for a given video presentation depends heavily on the nature of the video content.

Ideally, encoding profiles could be optimized for every video presentation. However, given the vast and growing libraries of video titles, as well as the many channels of live content that are encoded in real time, such an approach is not practicable. Instead, content providers typically use one or only a small number of encoding profiles to compress all of their video content. This results in a great many instances in which an encoding profile is not particularly well-suited for a given video presentation.

DETAILED DESCRIPTION

This disclosure describes techniques that employ both supervised and unsupervised machine learning to classify video content for compression using encoding profiles that are optimized for each type of video content. Video samples are initially classified into one of a relatively small number of semantic classes by a classifier that is trained using known training samples. Video samples assigned to a particular semantic class are then further classified into one of a number of sub-groups within that class that are derived using an unsupervised clustering technique on the training samples assigned to that semantic class. Each cluster represents video samples having similar encoding complexity. A video sample assigned to a particular cluster is then encoded using an encoding profile optimized for that cluster. An example will be instructive.

Figure 1:
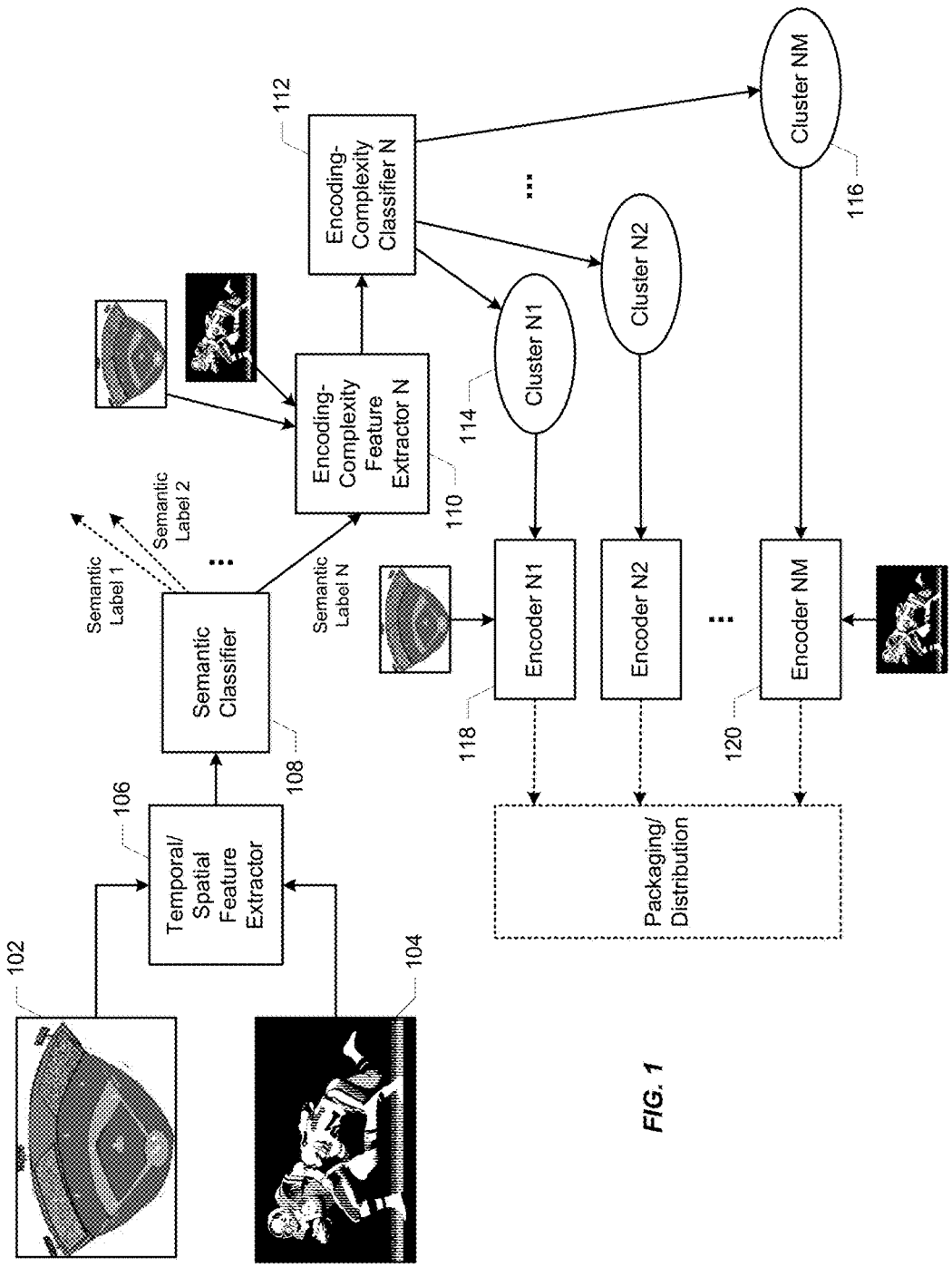
FIG. 1 illustrates an example of content classification and compression as enabled by the present disclosure.

Assume that, shown in FIG. 1, two video feeds 102 and 104 are received that depict two different live sporting events, a football game and a baseball game. Both feeds are to be encoded for streaming. Conventionally, both feeds would be compressed using the same encoding profile. However, as sports fans are well aware, video presentations of the two games differ significantly in terms of the amount of motion and the typical field of view displayed. Thus, the same encoding profile, even if optimized for the broad class of live sporting events, would likely not be appropriate for both presentations.

According to a particular implementation enabled by the present disclosure, temporal and spatial features are extracted (106) from the video of each feed and used by semantic classifier 108 to classify each of the videos into one of a number of broad semantic classes that might include, for example, action movie, dramatic movie, live sporting event, news presentation, animation feature, etc. This initial classification is performed by a classifier that was trained in a supervised manner on known video samples. In this example, because both video feeds have at least some similar characteristics (e.g., synthetic graphical elements superimposed on a turf field of play) both would likely be classified in the same category (e.g., live sporting event). However, this is not the end of the classification. Simply because both videos are initially assigned to the same class does not mean they will be encoded using the same encoding profile.

Once assigned the same semantic label, another set of features is extracted (110) from both videos that represents the encoding complexity of each. As will be discussed, the set of features and the way in which the features are weighted may be specific to the semantic class and/or may evolve over time to reflect subsequent run-time classification. Because the encoding complexity of a football game is typically greater than that of a baseball game, the two videos are likely to be assigned by encoding-complexity classifier 112 to different clusters 114 and 116 within the broader semantic class. And because the encoding profile associated with each cluster is optimized for video samples having similar encoding complexities, each video will be compressed (by encoder 118 or 120) using an encoding profile that is more appropriate for its content. The encoded video is then packaged and stored or distributed.

Figure 2:
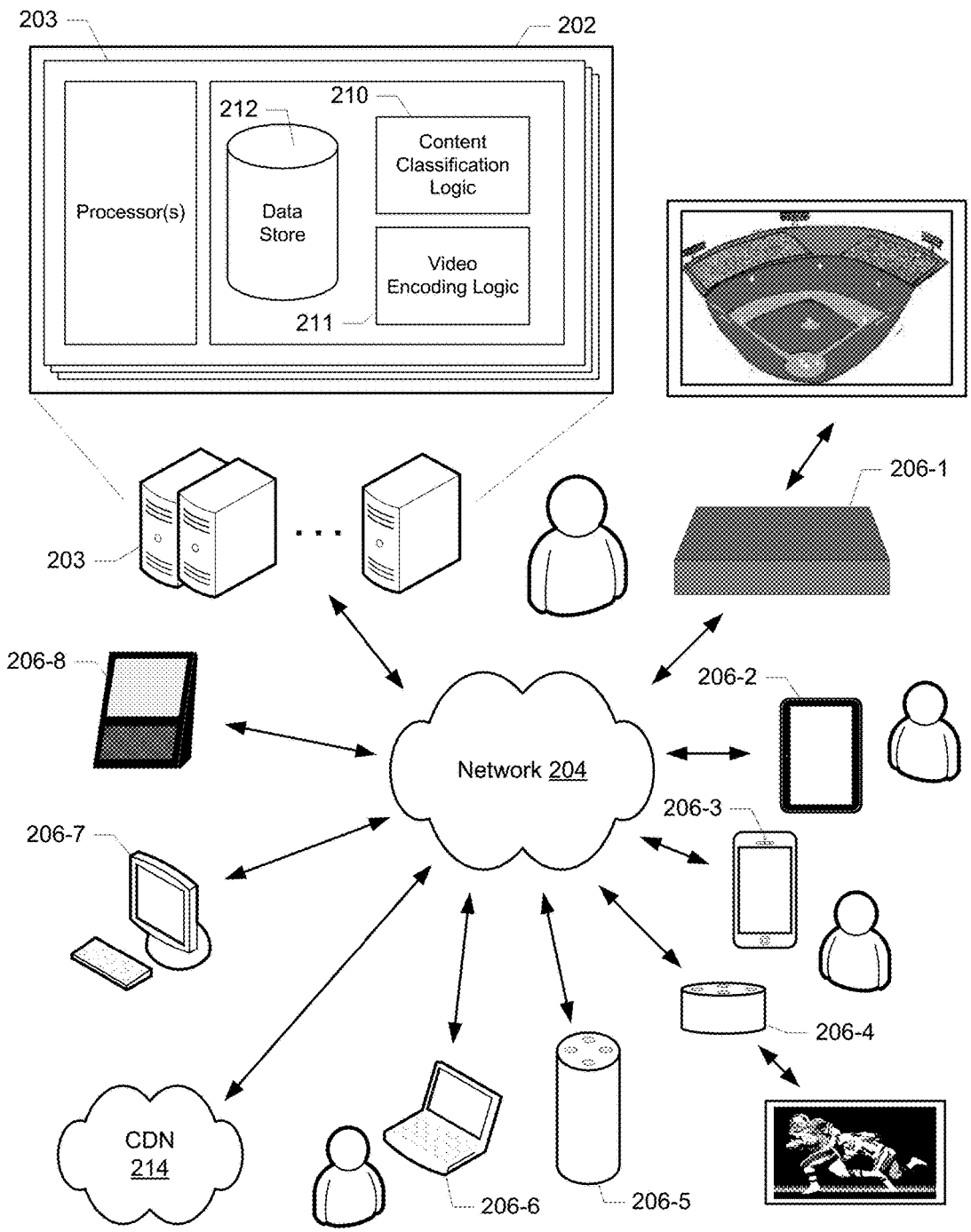
FIG. 2 depicts a computing environment in which implementations enabled by the present disclosure may be practiced.

FIG. 2 illustrates an example of a computing environment in which video streams may be classified and compressed for transmission via network 204 to a variety of client devices (206-1 through 206-8) in accordance with the techniques described herein. Service 202 may conform to any of a wide variety of architectures such as, for example, a services platform deployed at one or more co-locations, each implemented with one or more servers 203. Network 204 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, and so on. Client devices 206 may be any suitable device capable of connecting to network 204 and generating and/or consuming content streams. Such devices may include, for example, mobile devices (e.g., cell phones, smart phones, tablets, and the like), personal computers (e.g., laptops and desktops), set top boxes (e.g., for cable, satellite, and online systems), smart televisions, gaming consoles, wearable computing devices (e.g., smart watches or smart glasses), internet-connected cameras, voice-activated smart home devices (e.g., with integrated personal digital assistants), etc.

At least some of the examples described herein contemplate implementations based on computing models that enable on-demand network access to a shared pool of computing resources (e.g., networks, servers, storage, applications, and services). As will be understood, such computing resources may be integrated with and/or under the control of the same entity controlling service 202. Alternatively, such resources may be independent of service 202, e.g., on a platform under control of a separate provider of services and/or computing resources with which service 202 connects to consume resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

It should also be noted that implementations are contemplated in which, in addition to content classification logic 210 and video encoding logic 211, service 202 may include other types of logic (not shown) involved in the delivery of content as part of a video-on-demand service or a live/broadcast video service.

In addition to classifying and encoding video content, and providing access to video streams, service 202 may also include a variety of information related to the video content (e.g., other associated metadata and manifests in data store 212 which service 202 uses, or to which service 202 provides access). Data store 212 may also include data representing machine learning models and encoding profiles implemented and generated as described herein. Alternatively, any of this information may be provided and/or hosted by one or more separate platforms, e.g., CDN 214 or other third-party platform. It should be noted that, while logic 210 and 211, and data store 212 are shown as integrated with service 202, implementations are contemplated in which some or all of these operate remotely from the associated service, and/or are under the control of an independent entity. Those of skill in the art will understand the diversity of use cases to which the techniques described herein are applicable.

Figure 3:
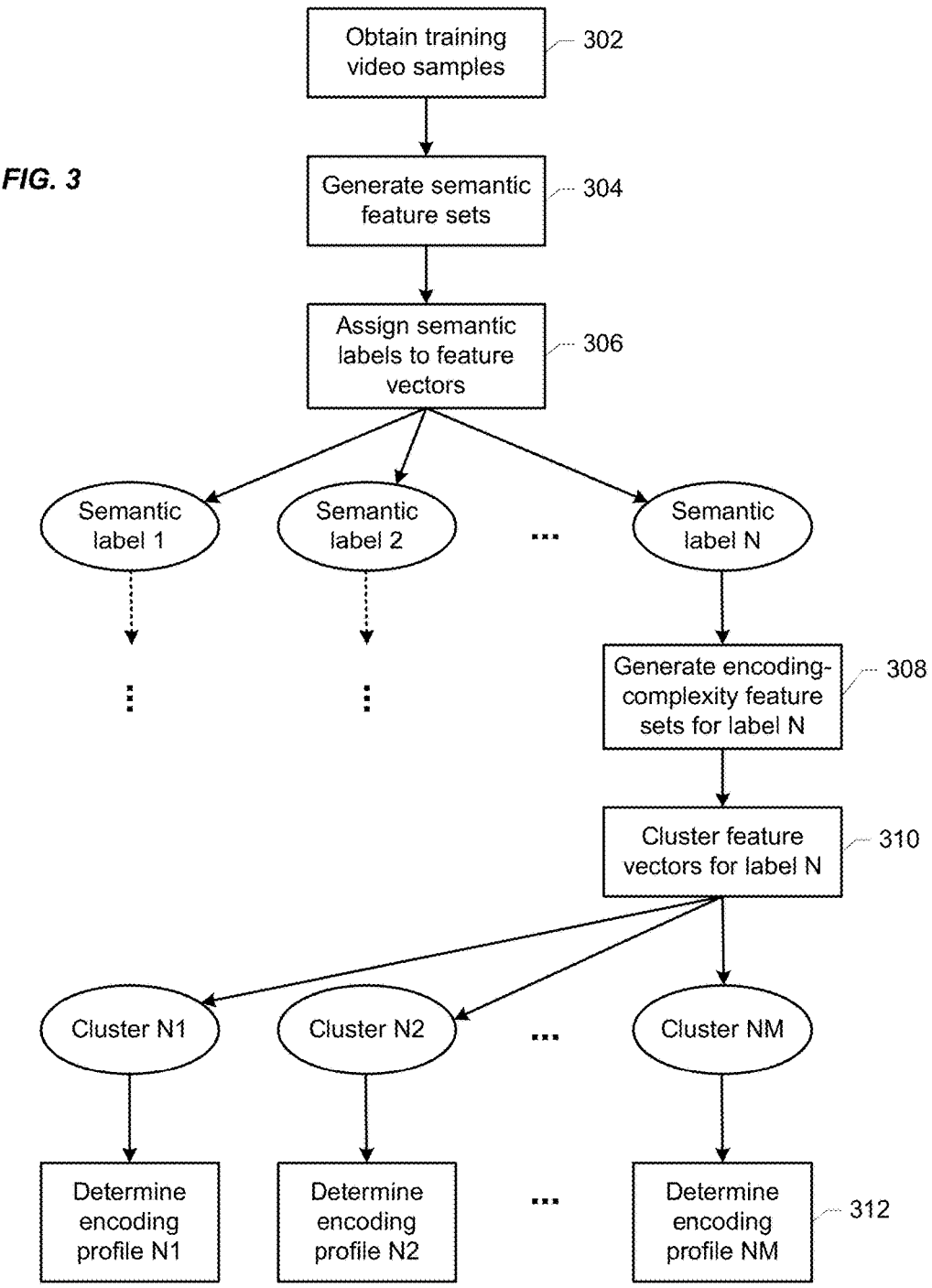
FIG. 3 is a flowchart illustrating operation of a class of implementations enabled by the present disclosure.

FIG. 3 is a flowchart illustrating a particular class of implementations in which two machine-learning approaches, one using supervised learning and the other unsupervised learning, are combined in a cascading way. As discussed above, supervised learning is used to classify video samples into a number of predefined semantic classes (e.g., animation, sports, drama, etc.). Within each semantic class unsupervised learning is used to cluster the video samples according to encoding complexity. The video samples may be entire video presentations (e.g., an entire movie or sportscast) or may be shorter segments within a presentation, e.g., 2-60 second segments including one or more 2-10 second fragments or "groups of pictures" (GOPs). As will be appreciated, classification of segments within a video allows for a more precise matching of encoder settings to individual scenes within a presentation.

It should be noted that the techniques described herein are agnostic to specific codec implementation, and may be employed to configure encoders implemented according to any of a wide variety video compression standards including, for example, Advanced Video Coding (AVC) or H.264, High Efficiency Video Coding (HEVC) or H.265, AV1, VP8, and VP9, as well as future standards, e.g., H.266.

A training data set of video samples is generated (302) in a process by which the video samples are classified by human operators into the semantic classes (e.g., hundreds of video samples into 10 different classes). In some implementations, the semantic classes are conceptually similar to content genres and might include, for example, animation, news, action, drama, live sporting events, documentary, horror, etc. Semantic classes may also relate to particular content characteristics including, for example, film grains, computer graphic layers, etc.

Spatial and temporal features are extracted from the raw (uncompressed) video samples and/or associated metadata (304). These features might relate, for example, to texture, color, motion, scenes, context, text (e.g., extracted from metadata), etc. Different types of features provide different cues for discriminating among the various semantic classes. For example, live sports videos are characterized by high motion changes and complex color and texture statistics that are associated with sports-related keyword histograms from associated metadata. By contrast, simple cartoon animations are characterized by slow motion changes and simple color and texture statistics. Feature extraction techniques can be deployed to fully represent each feature type. For example a color histogram and other derived higher-order statistics can be computed to represent the color features, whereas Gabor-filter banks and other multi-resolution filtering approaches can be applied to the luminance components of video frames to extract texture features. It should also be noted that the various features extracted may be combined in a variety of ways. For example, a unified feature vector may be constructed by concatenating the feature components, or by applying advanced assembling of weak classifiers using subsets of feature components to achieve stronger classification results. Other options of feature representations and/or feature fusion techniques are available from the computer vision field, which can be utilized and implemented to extend and improve the effectiveness of the semantic classification step.

The semantic feature vectors are used to train a classifier on the semantic classes using supervised learning (306). Supervised learning is a broad class of machine learning in which a classifier learns a function that maps an input to an output based on examples of input/output pairs, i.e., training data. The classifier may be any of a wide variety of classifier types including, for example, a neural network, a support vector machine, a linear regression algorithm, a k-nearest neighbor algorithm, etc. As will be discussed, at run time the trained semantic classifier will classify new unknown video samples into one of the semantic classes.

A potential benefit of using a supervised learning classifier for the initial classification of video samples is that it narrows down the set of video samples for subsequent clustering in a way that results in samples that are more similar in terms of their complexities. Another potential advantage is that features and/or feature weights used for subsequent clustering within each semantic class can be tailored to the complexity and characteristics of the content within that class. Dynamic feature set grouping and weight factor adjustment improves the efficiency and effectiveness of grouping diverse video content into different encoding complexity clusters (e.g., such as separating football videos from baseball videos). This, in turn, leads to better compression efficiency adaptive to each video content type and its characteristics.

Within each semantic class, a feature set is generated for each of the video samples that represents the sample's encoding complexity (308). According to a particular implementation, this feature set is different than the feature set used for the semantic class described above and might include, for example, intra-frame complexity statistical features, predictive frame complexity statistical features, bi-directional predictive frame complexity features, residual energy statistical features, to name a few. The features may be computed, for example, based on histograms of statistical features that represent the level of complexity of an individual frame as well as complexity across multiple frames.

In addition, the features used and/or the manner in which the features are weighted may vary for the samples in different semantic classes. For example, the importance of various spatial and temporal features for animation content is typically very different than for live action content so the emphases placed on these features can reflect this understanding. Moreover, the features used for unsupervised clustering may be adaptively computed within each semantic class such that the models that are used in the different semantic classes diverge from each other as they evolve.

According to some implementations, the encoding-complexity features of each video sample assigned to a particular semantic class are generated based on a "look-ahead" encoding or "pre-encoding" of the video sample. According to a particular implementation, the pre-encoding of the video sample is performed on a down-sampled version of the raw video. The sampling can be in both temporal and spatial domains. The encoding of the down-sampled video may use fast preset options of modern codecs (such as AVC or HEVC) which not only achieves reduced computational cost, but also provides encoding log data for measuring encoding complexity. Typical encoding analysis and log data generated by the pre-encoding of each video sample include, for example, the block sizes used in each frame, the motion vectors computed across different frames, residual energies, etc. The encoding-complexity features used for the unsupervised clustering are derived from these data. Within each semantic class, the same pre-encoding settings are used to maintain consistent quality so that the analysis data accurately and consistently reflect the encoding complexity of the content in that class. However, it should be noted that these settings may evolve over time as the clusters within the class evolve.

Figure 4:
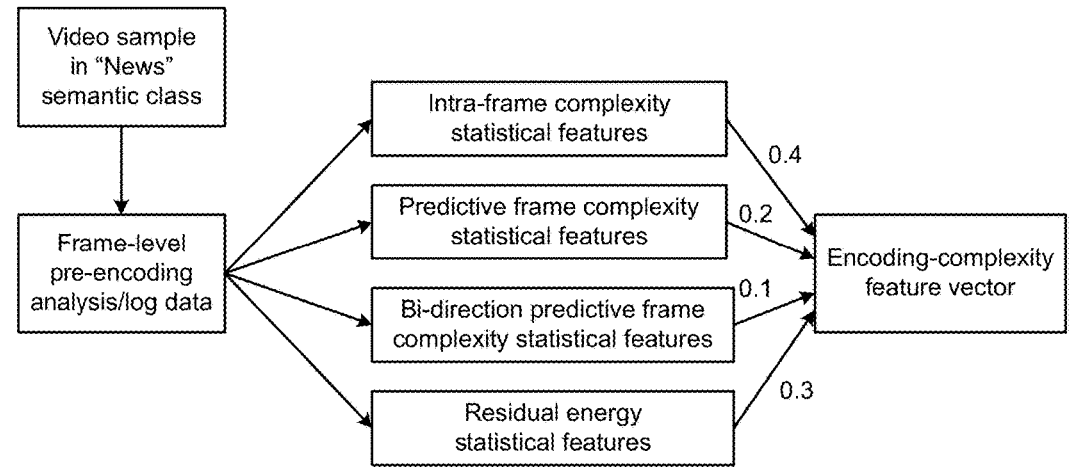
FIG. 4 illustrates how features in a feature set may be weighted for different semantic classes.
Figure 4:
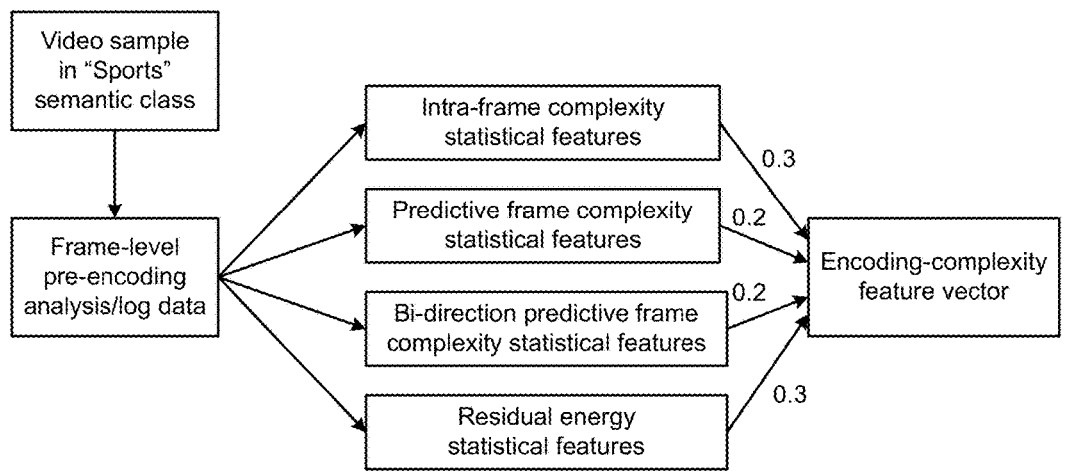

FIG. 4 illustrates an example in which weights associated with different features might be modified based on the semantic class to which a video sample is assigned. In the upper diagram, the input video sample has been classified with the semantic label "News." Four different types of statistical features (in this example, intra-frame complexity, predictive frame complexity, bi-directional predictive frame complexity, and residual energy) are assigned weights 0.4, 0.2, 0.1, and 0.3, respectively. By contrast, and as shown in the lower diagram, the same types of statistical features for a video sample classified with the semantic label "Sports" are weighted 0.3, 0.2, 0.2, and 0.3, respectively.

The semantic label/class inherently provides a semantic context for the video samples within the class. For example, news videos typically have very small temporal changes and medium to complex spatial details, whereas sports videos may exhibit dramatic temporal changes and medium spatial details. With this contextual information, increasing the weights for intra-frame complexity feature components (as measures for spatial details) while reducing the weights for bi-directional predictive frame complexity feature component (for measuring temporal complexity) will help improve the clustering efficiency for all the video samples within the news class. Similarly, improved clustering efficiency for videos in the sports class can be achieved by increasing the weights for a bi-directional predictive frame complexity feature component and adjusting the weights for intra-frame complexity feature components. It should be noted that these adaptive weights can either be assigned offline by subject matter experts or learned automatically by state-of-the-art deep learning techniques.

According to a particular implementation, 56 features are extracted from the pre-encoding results to generate a 56-dimension feature vector for each video sample. Important components in this feature vector are based on the average encoding bit-rate cost for intra-frame prediction and/or the average encoding bit-rate cost for inter-frame prediction. These represent good measures for the complexity of sample's spatial features and the complexity of motion. The feature vector may also include one or more elements computed based on a histogram of motion vectors. The feature vector may also include one or more elements computed based on the average residue energy for a particular frame and/or the average residue energy across consecutive frames. The feature vector may also include one or more elements computed based on the color and luminance components of these energies. The feature vector may also include one or more elements computed based on higher-order statistical features (such as the standard deviation, second or third order moments) computed based on the previous frame-level sequence of base feature values. Some additional examples of possible encoding-complexity features are described below in Table 1.

TABLE 1

| Features | Description | Notes |
| --- | --- | --- |
| Bits Per Pixel (BPP) | #.Total Bits/#.Pixels | Overall encoding cost |
| I-frame Cost Ratio | #.I-frame Bits/#.Total Bits | Spatial complexity |
| I-frame BPP | #.I-frame Bits/#.I-frame Pixels | Spatial complexity |
| P/B-frame BPP | #.P/B-frame Bits/#.P/B-frame Pixels | Temporal complexity |
| I-frame Ratio | #.I-frame Count/#.Total Frames | Scene changes frequency |
| I-frame Luma. Distortion Average | Avg. (I-frame Luma. Distortions) | Spatial complexity |
| P-frame Luma. Distortion Average | Avg. (P-frame Luma. Distortions) | Temporal complexity |
| B-frame Luma. Distortion Average | Avg. (B-frame Luma. Distortions) | Temporal complexity |
| I-frame Luma. Distortion Variance | Var. (I-frame Luma. Distortions) | Spatial complexity |
| P-frame Luma. Distortion Variance | Var. (P-frame Luma. Distortions) | Temporal complexity |
| B-frame Luma. Distortion Variance | Var. (B-frame Luma. Distortions) | Temporal complexity |
| I-frame Chroma Distortion Average | Avg. (I-frame Chroma. Distortions) | Spatial complexity |
| P-frame Chroma Distortion Average | Avg. (P-frame Chroma. Distortions) | Temporal complexity |
| B-frame Chroma Distortion Average | Avg. (B-frame Chroma. Distortions) | Temporal complexity |
| I-frame Chroma Distortion Variance | Var. (I-frame Chroma. Distortions) | Spatial complexity |
| P-frame Chroma Distortion Variance | Var. (P-frame Chroma. Distortions) | Temporal complexity |
| B-frame Chroma Distortion Variance | Var. (B-frame Chroma. Distortions) | Temporal complexity |
| I-frame Residual Energy Average | Avg. (I-frame Residual Energies) | Spatial complexity |
| P-frame Residual Energy Average | Avg. (P-frame Residual Energies) | Temporal complexity |

TABLE 1-continued

| Features | Description | Notes |
| --- | --- | --- |
| B-frame Residual Energy Average | Avg. (B-frame Residual Energies) | Temporal complexity |
| I-frame Residual Energy Variance | Var. (I-frame Residual Energies) | Spatial complexity |
| P-frame Residual Energy Variance | Var. (P-frame Residual Energies) | Temporal complexity |
| B-frame Residual Energy Variance | Var. (B-frame Residual Energies) | Temporal complexity |
| Motion vector Magnitude Histogram | 16 bins | Temporal complexity |
| Motion vector Orientation Histogram | 16 bins | Temporal complexity |

Referring back to FIG. 3, the video samples are clustered with each semantic class based on the corresponding encoding-complexity feature sets using an unsupervised clustering technique (310). Any of a variety of clustering algorithms and associated models may be used such as, for example, a k-means clustering algorithm, an expectation-maximization clustering algorithm, a mean shift clustering algorithm, a hierarchical clustering algorithm, density-based clustering, grid-based clustering, as well as other clustering algorithms based on neural networks, etc. This clustering results in subsets of video samples within each class that are characterized by similar levels of encoding complexity, e.g., in terms of spatial and temporal features. According to various implementations, the number of clusters within a given semantic class might range from two to 8 or 10 clusters.

Given that the video samples associated with a particular semantic class and cluster have a similar level of encoding complexity, it follows that each may benefit from being encoded using similar encoder settings. Therefore, an encoding profile may be determined for each cluster (312).

According to a particular implementation, the encoding profile for a given cluster is generated using a rate-distortion optimization on the video samples assigned to that cluster (i.e., samples with the same semantic label and cluster id). Multiple encodes are run for each of the samples in the cluster. Each encode results in one data point representing bit rate, quality, and runtime for that encode. That is, the data points for the samples in the cluster may be distributed in two-dimensions (in which one dimension is bit rate and the other quality) or three-dimensions (adding the runtime dimension). The rate-distortion optimization finds the optimal balance between bit rate and quality based on these points. This maps to an encoding profile that is then associated with that semantic label and cluster id and used at run time for video samples that are mapped to that cluster. For various implementations, encoding profile settings may include (1) encoding bitrate ladders and associated video frame resolution choices, and (2) various encoding parameter choices and values such as adaptive quantization mode, adaptive quantization strength, quantization group size, intra-frame or inter-frame noise reduction strength, as well as other rate-quality optimization and post-processing parameter options.

Figure 5:
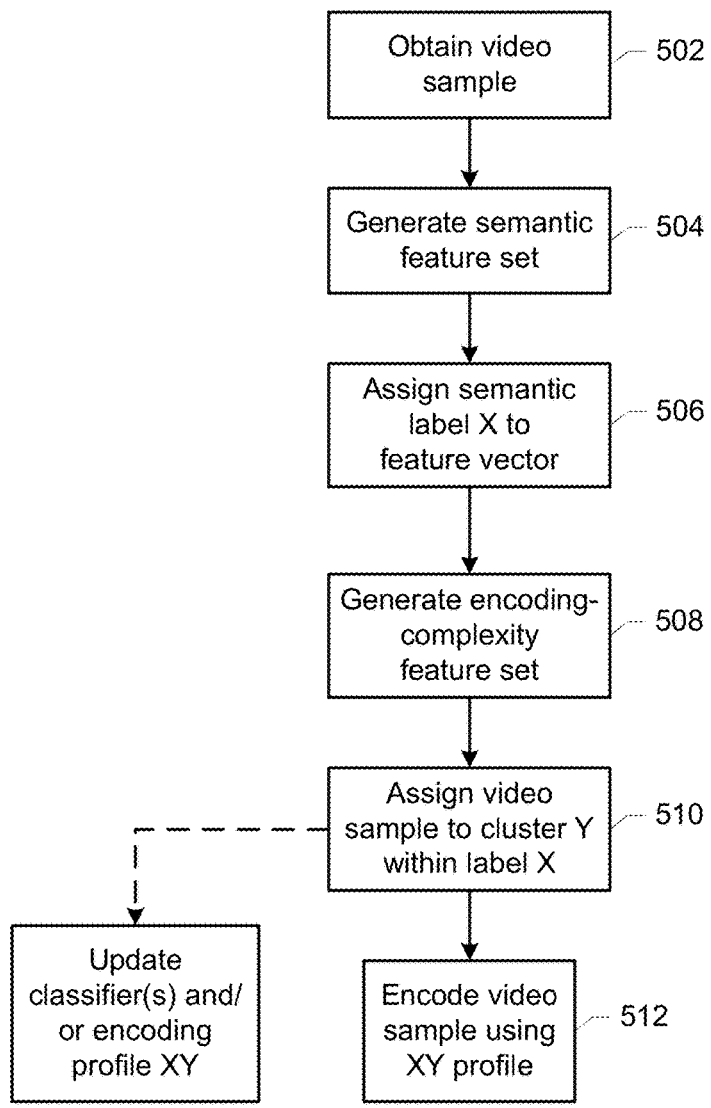
FIG. 5 is a flowchart illustrating operation of another class of implementations enabled by the present disclosure.

FIG. 5 is a flowchart illustrating run-time classification and encoding of a video sample as enabled by the present disclosure. An unclassified video sample is received (502), and spatial and temporal features are extracted from the raw video sample and/or associated metadata (504), for example, as described above with reference to FIG. 3. Based on a feature vector representing the extracted features, the video sample is assigned a particular one of a plurality of semantic labels (506), e.g., semantic label X, by a semantic classifier trained as described herein.

A feature set is generated from the video sample that represents its encoding complexity (508). As discussed above, this may be accomplished with a fast pre-encoding and use of the encoding results data. Based on this feature set, the video sample is assigned to a particular sub-group within the semantic class in which it was classified (510), e.g., cluster Y, using a clustering technique trained as described herein. The video sample is then encoded using an encoding profile corresponding to that semantic class and cluster id (512), e.g., encoding profile XY.

As described above, a semantic classifier and an encoding-complexity classifier implemented as enabled by the present disclosure are trained using an original set of training samples in an offline training process using both supervised and unsupervised learning. It should be noted, however, that both classifiers and the models they employ can continue to evolve during run-time based on the classification of new samples. For example, whenever new video sample comes is classified and encoded as described herein, the features extracted from the new sample may be used to update the models for the semantic class and cluster to which the sample gets assigned, as well as the corresponding encoding profile. This might be done, for example, each time a new sample gets classified. Alternatively, when a programmable number of new samples are assigned to a given cluster, the encoding profile for that cluster may be recalculated. In this way, the classifiers and encoding profiles can evolve and be refined over time.

While the subject matter of this application has been particularly shown and described with reference to specific implementations thereof, it will be understood by those skilled in the art that changes in the form and details of the disclosed implementations may be made without departing from the spirit or scope of the invention. For example, while implementations have been described herein with reference to the classification and encoding of video content, it should be noted and understood that implementations are contemplated in which the techniques described herein are applied to other types of content such as, for example, audio and images. The scope of the present disclosure should therefore not be limited to video content.

Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer program product, comprising one or more non-transitory computer-readable media having computer program instructions stored therein, the computer program instructions being configured such that, when executed by one or more computing devices, the computer program instructions cause the one or more computing devices to:

generate a supervised training feature set for each of a plurality of training video samples;

train a classifier to classify each of the training video samples into a corresponding one of a plurality of semantic classes based on the corresponding supervised training feature set;

generate an unsupervised training feature set for each of the plurality of training video samples;

cluster the training video samples within each of the semantic classes based on the corresponding unsupervised training feature sets thereby generating a plurality of clusters of video samples within each of the semantic classes;

determine an encoding profile for each of the clusters of video samples;

generate a semantic classification feature set based on a first video sample;

classify the first video sample into a first semantic class of the plurality of semantic classes based on the semantic classification feature set;

generate an encoding-complexity feature set based on the first video sample;

assign the first video sample to a first cluster of the plurality of clusters of video samples associated with the first semantic class based on the encoding-complexity feature set; and encode the first video sample using the encoding profile corresponding to the first cluster of video samples.

2. The computer program product of claim 1, wherein the computer program instructions are configured to cause the one or more computing devices to determine the encoding profile for each of the clusters of video samples by performing a rate-distortion optimization based on encoded versions of the corresponding training video samples.

3. The computer program product of claim 1, wherein the computer program instructions are configured to cause the one or more computing devices to generate the semantic classification feature set by extracting spatial features and temporal features from the first video sample, and wherein the computer program instructions are configured to cause the one or more computing devices to classify the first video sample into the first semantic class by determining that a feature vector including values representing the spatial and temporal features of the first video sample corresponds to the first semantic class.

4. The computer program product of claim 1 wherein the computer program instructions are configured to cause the one or more computing devices to generate the encoding-complexity feature set by:

encoding the first video sample using a pre-encode encoding profile; and extracting encoding-complexity features from encoding log data generated as a result of the encoding of the first video sample.

5. A computer-implemented method, comprising:

generating a semantic classification feature set based on a first video sample;

classifying the first video sample into a first semantic class of a plurality of semantic classes based on the semantic classification feature set, each of the semantic classes having a plurality of clusters of video samples associated therewith;

generating an encoding-complexity feature set based on the first video sample;

assigning the first video sample to a first cluster of video samples associated with the first semantic class based on the encoding-complexity feature set; and encoding the first video sample using a first encoding profile corresponding to the first cluster of video samples.

6. The method of claim 5, wherein generating the semantic classification feature set includes extracting spatial features and temporal features from the first video sample.

7. The method of claim 6, wherein classifying the first video sample into the first semantic class includes determining that a feature vector including values representing the spatial and temporal features of the first video sample corresponds to the first semantic class.

8. The method of claim 5, wherein generating the encoding-complexity feature set includes:

encoding the first video sample using a pre-encode encoding profile; and extracting encoding-complexity features from encoding log data generated as a result of the encoding of the first video sample.

9. The method of claim 5, wherein classifying the first video sample is done using a classifier, the method further comprising:

generating a supervised training feature set for each of a plurality of training video samples, each of the training video samples having a known correspondence to one of a plurality of semantic classes; and training the classifier to classify each of the training video samples into a corresponding one of the semantic classes based on the corresponding supervised training feature set.

10. The method of claim 9, further comprising:

generating an unsupervised training feature set for each of the training video samples; and clustering the training video samples associated with each of the semantic classes based on the corresponding unsupervised training feature sets thereby generating the plurality of clusters of video samples associated with each of the semantic classes.

11. The method of claim 10, further comprising modifying the clusters associated with the semantic classes based on run-time classification of new video samples.

12. The method of claim 10, further comprising determining the first encoding profile for the first cluster of video samples by performing a rate-distortion optimization based on encoded versions of the training video samples included in the first cluster of video samples.

13. A system, comprising one or more computing devices configured to:

generate a semantic classification feature set based on a first video sample;

classify the first video sample into a first semantic class of a plurality of semantic classes based on the semantic classification feature set, each of the semantic classes having a plurality of clusters of video samples associated therewith;

generate an encoding-complexity feature set based on the first video sample;

assign the first video sample to a first cluster of video samples associated with the first semantic class based on the encoding-complexity feature set; and encode the first video sample using a first encoding profile corresponding to the first cluster of video samples.

14. The system of claim 13, wherein the one or more computing devices are configured to generate the semantic classification feature set by extracting spatial features and temporal features from the first video sample.

15. The system of claim 14, wherein the one or more computing devices are configured to classify the first video sample into the first semantic class by determining that a feature vector including values representing the spatial and temporal features of the first video sample corresponds to the first semantic class.

16. The system of claim 13, wherein the one or more computing devices are configured to generate the encoding-complexity feature set by:
    encoding the first video sample using a pre-encode encoding profile; and
    extracting encoding-complexity features from encoding log data generated as a result of the encoding of the first video sample.

17. The system of claim 13, wherein the one or more computing devices are configured to classify the first video sample using a classifier, and wherein the one or more computing devices are further configured to:
    generate a supervised training feature set for each of a plurality of training video samples, each of the training video samples having a known correspondence to one of a plurality of semantic classes; and
    train the classifier to classify each of the training video samples into a corresponding one of the semantic classes based on the corresponding supervised training feature set.

18. The system of claim 17, wherein the one or more computing devices are further configured to:
    generate an unsupervised training feature set for each of the training video samples; and
    cluster the training video samples associated with each of the semantic classes based on the corresponding unsupervised training feature sets thereby generating the plurality of clusters of video samples associated with each of the semantic classes.

19. The system of claim 18, wherein the one or more computing devices are further configured to modify the clusters associated with the semantic classes based on runtime classification of new video samples.

20. The system of claim 18, wherein the one or more computing devices are further configured to determine the first encoding profile for the first cluster of video samples by performing a rate-distortion optimization based on encoded versions of the training video samples included in the first cluster of video samples.

* * * * *